United States Patent
You et al.

(10) Patent No.: US 7,894,008 B2
(45) Date of Patent: Feb. 22, 2011

(54) DISPLAY APPARATUS AND DRIVING METHOD THEREOF

(75) Inventors: Hye-ran You, Yongin-si (KR); Yoon-sung Um, Yongin-si (KR); Jae-jin Lyu, Yongin-si (KR); Seung-beom Park, Seoul (KR); Jin-won Park, Suwon-si (KR); Hoon Kim, Ansan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 190 days.

(21) Appl. No.: 12/077,496

(22) Filed: Mar. 18, 2008

(65) Prior Publication Data

US 2009/0002583 A1    Jan. 1, 2009

(30) Foreign Application Priority Data

Jun. 29, 2007    (KR) .................. 10-2007-0065452

(51) Int. Cl.
*G02F 1/1343* (2006.01)

(52) U.S. Cl. .......................................... 349/38; 349/39

(58) Field of Classification Search .................. 349/38, 349/39
See application file for complete search history.

(56) References Cited

U.S. PATENT DOCUMENTS

| | | | | |
|---|---|---|---|---|
| 5,686,976 A * | 11/1997 | Nishikawa | .................... | 349/38 |
| 5,801,673 A * | 9/1998 | Shimada et al. | ............. | 345/100 |
| 6,850,289 B2 * | 2/2005 | Lee | .............. | 349/42 |
| 6,888,604 B2 * | 5/2005 | Rho et al. | ................... | 349/146 |
| 7,294,855 B2 * | 11/2007 | Baek et al. | .................... | 257/72 |
| 7,453,086 B2 * | 11/2008 | Kim et al. | ..................... | 257/59 |
| 7,518,687 B2 * | 4/2009 | Chen et al. | ................... | 349/139 |
| 2003/0214472 A1 * | 11/2003 | Chen | ........................ | 345/87 |
| 2004/0041149 A1 * | 3/2004 | Baek et al. | .................... | 257/49 |
| 2004/0041153 A1 * | 3/2004 | Lee | .............. | 257/72 |
| 2004/0169807 A1 * | 9/2004 | Rho et al. | ................... | 349/139 |
| 2004/0183955 A1 * | 9/2004 | Souk et al. | .................... | 349/43 |
| 2005/0162600 A1 * | 7/2005 | Rho et al. | ................... | 349/139 |
| 2005/0179631 A1 * | 8/2005 | Lyu | .............. | 345/87 |
| 2006/0119756 A1 * | 6/2006 | Shin et al. | ..................... | 349/38 |
| 2006/0208981 A1 * | 9/2006 | Rho et al. | ..................... | 345/88 |
| 2006/0231838 A1 * | 10/2006 | Kim | .......................... | 257/59 |
| 2006/0262237 A1 * | 11/2006 | Chen et al. | .................... | 349/38 |
| 2006/0274009 A1 * | 12/2006 | Lee | .............. | 345/92 |
| 2007/0057887 A1 * | 3/2007 | Itakura et al. | ................. | 345/90 |
| 2007/0109238 A1 * | 5/2007 | Lee et al. | ..................... | 345/87 |
| 2007/0109482 A1 * | 5/2007 | Kim | .......................... | 349/144 |
| 2007/0132695 A1 * | 6/2007 | Kim | .............. | 345/98 |
| 2007/0132899 A1 * | 6/2007 | Cheng et al. | ................. | 349/38 |

(Continued)

*Primary Examiner*—K. Cyrus Kianni
(74) *Attorney, Agent, or Firm*—Innovation Counsel LLP (57) ABSTRACT

A display apparatus including a plurality of gate lines, a data line intersecting the plurality of gate lines; a first pixel unit connected with a n-th gate line of the plurality of gate lines and the data line. A second pixel unit connected with a (n+1)-th gate line of the plurality of gate lines; and a coupling capacitor disposed between the first pixel unit and the second pixel unit, wherein the first pixel unit comprises a first liquid crystal capacitor and a first thin film transistor (TFT), the second pixel unit comprises a second liquid crystal capacitor and a second thin film transistor (TFT), and a source electrode and a drain electrode of the second TFT are connected with both electrodes of the coupling capacitor, respectively.

8 Claims, 5 Drawing Sheets

U.S. PATENT DOCUMENTS

2007/0188431 A1* 8/2007 Sato et al. .................... 345/90
2007/0194331 A1* 8/2007 Yeh et al. .................... 257/88
2008/0007506 A1* 1/2008 Chen et al. .................. 345/92
2009/0096950 A1* 4/2009 Kim et al. .................... 349/43
2009/0315035 A1* 12/2009 Yeh et al. .................... 257/71

* cited by examiner

DISPLAY APPARATUS AND DRIVING METHOD THEREOF

CROSS-REFERENCE TO RELATED APPLICATION

This application claims priority from Korean Patent Application No. 10-2007-0065452 filed on Jun. 29, 2007, in the Korean Intellectual Property Office, the disclosure of which is incorporated herein by reference in its entirety.

BACKGROUND OF THE INVENTION

1. Field of the Invention

The present invention relates to a display apparatus and a driving method thereof.

2. Description of the Related Art

Liquid crystal displays (LCD) are one of the most widely used flat panel displays. An LCD typically includes two panels provided with field-generating electrodes such as pixel electrodes and a common electrode, and a liquid crystal (LC) layer interposed therebetween. The LCD displays images by applying voltages to the field-generating electrodes to generate an electric field in the LC layer. The applied electric field determines the orientations of LC molecules in the LC layer to adjust the polarization of incident light.

The LCD comprises a plurality of thin film transistors (TFT) connected with each of the pixel electrodes and a plurality of signal lines connected with the TFTs, such as gate lines and data lines.

Among the LCDs, a vertically aligned (VA) LCD, in which LC molecules are aligned such that the long axes of the LC molecules are perpendicular to the plates in the absence of an electric field, offers a high contrast ratio and a wide reference viewing angle. The reference viewing angle is defined as a viewing angle making the contrast ratio equal to 1:10 or as a limit angle for the inversion in luminance between the grays.

A wide viewing angle of the VA mode LCD can be realized by, for example, cutouts in the field-generating electrodes and protrusions on the field-generating electrodes. The cutouts and the protrusions can determine the tilt directions of the LC molecules. The tilt directions can be distributed in several directions by using the cutouts and the protrusions such that the reference viewing angle can be widened.

However, the cutouts and the protrusions decrease the aperture. Also, the lateral visibility of the VA mode LCD is low. For example, images displayed by a patterned vertically aligned (PVA) LCD equipped with the cutouts become brighter nearer to the lateral sides of the PVA LCD, thereby decreasing lateral visibility.

In order to improve lateral visibility of an LCD, a variety of methods of dividing a pixel electrode into a pair of sub-pixel electrodes, applying voltage to the one sub-pixel electrode using thin film transistor (TFT) and applying voltage to the other sub-pixel electrode using a coupling capacitor so that the sub-pixel electrodes can be supplied with different voltages have been suggested.

SUMMARY OF THE INVENTION

Aspects of the present invention provide a display apparatus having excellent lateral visibility without image sticking.

Aspects of the present invention also provide a driving method of a display apparatus having excellent lateral visibility without image sticking.

However, the aspects of the present invention are not restricted to ones set forth herein. The above and other aspects of the present invention will become apparent to one of ordinary skill in the art to which the present invention pertains by referencing the detailed description of the present invention given below.

According to a first aspect of the present invention, there is provided a display apparatus including: a plurality of gate lines; a data line intersecting the plurality of gate lines; a first pixel unit connected with a n-th gate line of the plurality of gate lines and the data line; a second pixel unit connected with a (n+1)-th gate line of the plurality of gate lines; and a coupling capacitor disposed between the first pixel unit and the second pixel unit, wherein the first pixel unit comprises a first liquid crystal capacitor and a first thin film transistor (TFT), the second pixel unit comprises a second liquid crystal capacitor and a second thin film transistor (TFT), and a source electrode and a drain electrode of the second TFT are connected with both electrodes of the coupling capacitor, respectively. One electrode of the first liquid crystal capacitor and one electrode of the coupling capacitor are formed of a first pixel electrode. Here, the first pixel electrode is formed of transparent metal. One electrode of the second liquid crystal capacitor and the other electrode of the coupling capacitor are formed of a second pixel electrode. Here, the second pixel electrode is formed of transparent metal.

The display apparatus further comprises a plurality of storage electrode lines, wherein the first pixel unit comprises a storage capacitor connected with the n-th storage electrode line of the plurality of storage electrode lines and the first TFT. Here, a storage-capacitance voltage applied to the n-th storage electrode line has a fixed or variable level.

According to a second aspect of the present invention, there is provided a display apparatus including: a plurality of gate lines; a data line intersecting the plurality of gate lines; a first pixel unit connected with a n-th gate line of the plurality of gate lines and the data line, comprising a first liquid crystal capacitor and a first thin film transistor (TFT); a second pixel unit connected with the n-th gate line and the data line, comprising a second liquid crystal capacitor and a second thin film transistor (TFT); and a third thin film transistor (TFT) connected with the (n+1)-th gate line of the plurality of gate lines and second pixel unit, wherein a coupling capacitor is disposed between a drain electrode of the second TFT and one electrode of the second liquid crystal capacitor. A gate electrode of the third TFT is connected with the (n+1)-th gate line, a source electrode of the third TFT is connected with the drain electrode of the second TFT and one electrode of the coupling capacitor, a drain electrode of the third TFT is connected with the one electrode of the second liquid crystal capacitor and the other electrode of the coupling capacitor. Here, the first pixel unit further comprises a first storage capacitor, and one electrode of the first liquid crystal capacitor and one electrode of the first storage capacitor are formed of a first pixel electrode.

The display apparatus further comprises a plurality of storage electrode lines, wherein the other electrode of the first is connected with a n-th storage electrode line of the plurality of storage electrode lines. Here, a storage-capacitance voltage applied to the n-th storage electrode line has a fixed or a variable level. The second pixel unit further comprises a second storage capacitor, and the one electrode of the second liquid crystal capacitor, the one electrode of the second storage capacitor and the other electrode of the coupling capacitor are formed of a second pixel electrode. Here, the second pixel electrode is formed of transparent metal.

According to a third aspect of the present invention, there is provided a driving method of a display apparatus including: applying a data voltage to a first pixel unit and a second pixel unit connected with the first pixel unit through a coupling capacitor, and discharging the coupling capacitor. Here, the discharging of the coupling capacitor comprises providing electric charge in the coupling capacitor to the second pixel unit. When the first pixel unit and the second pixel unit are connected with a first gate line, the applying of a data voltage is enabled by a first gate signal applied to the first gate line, and the discharging of the coupling capacitor is enabled a second gate signal applied to a second gate line. The first pixel unit comprises a first liquid crystal capacitor including a first pixel electrode and a common electrode, and a first storage capacitor including the first pixel electrode and a storage-capacitance electrode, and the applying of a data voltage comprises applying a storage-capacitance voltage having a fixed level to the storage-capacitance electrode, or the applying a data voltage comprises applying a storage-capacitance voltage having a variable level to the storage-capacitance electrode.

Details of other embodiments of the invention are included in the detailed description of the invention and the drawings.

DETAILED DESCRIPTION OF EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those of ordinary skill in the art, and the present invention will only be defined by the appended claims.

Figure 1:
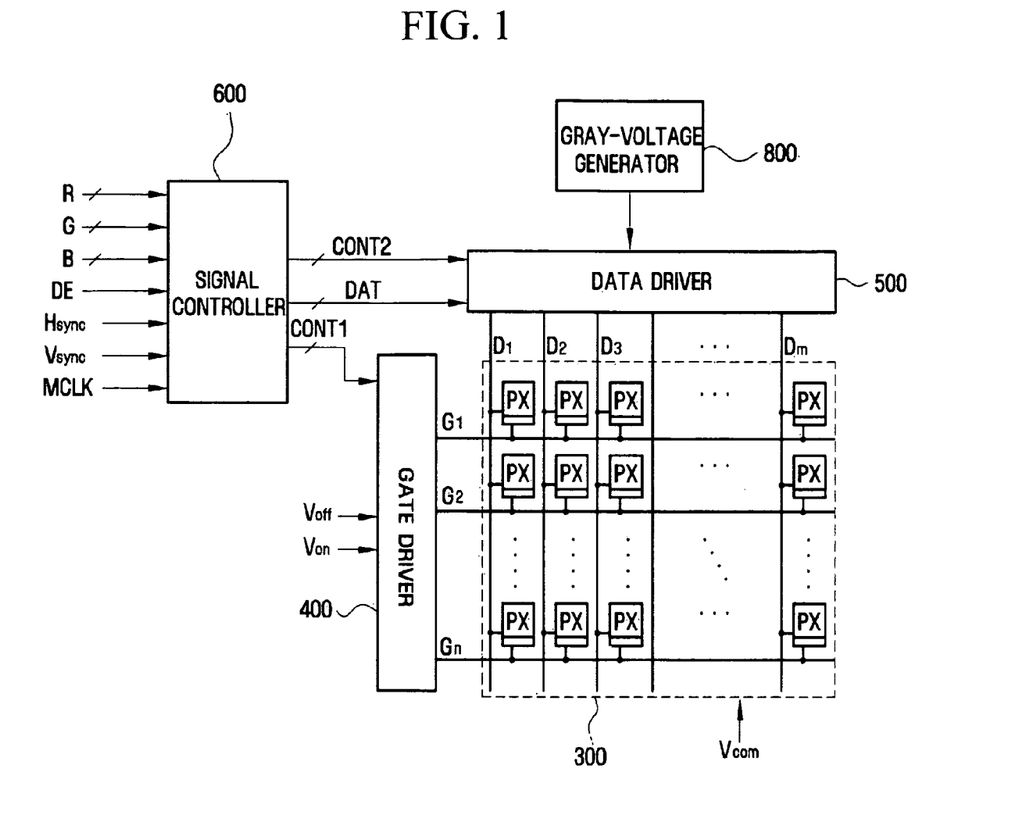
FIG. 1 is a block diagram illustrating a liquid display apparatus according to an exemplary embodiment of the invention.
Figure 2:
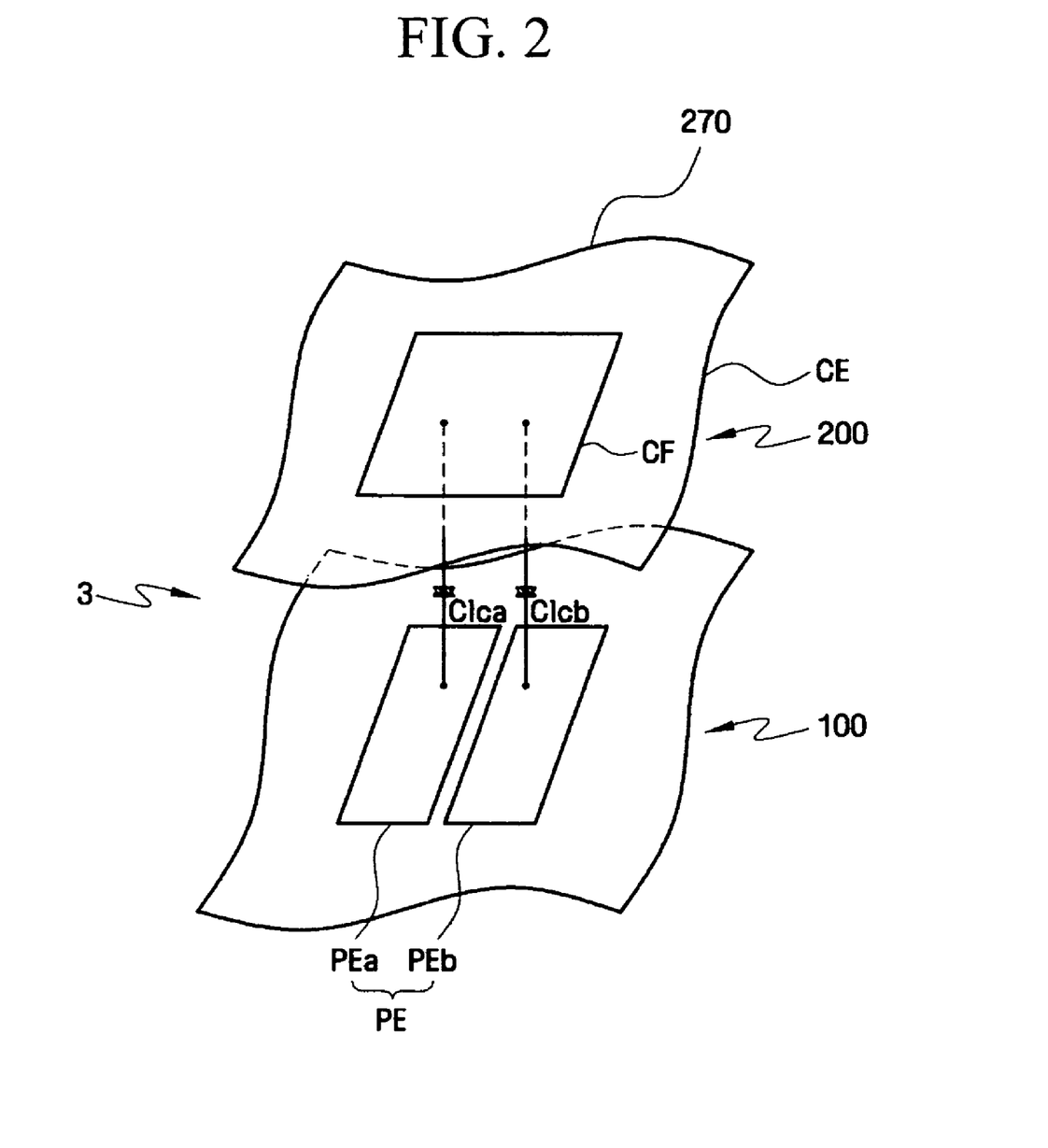
FIG. 2 is a pictorial, perspective diagram illustrating a pixel of the type employed in FIG. 1.

FIG. 1 is a block diagram of a liquid crystal display apparatus according to an exemplary embodiment of the invention, and FIG. 2 is a diagram illustrating the type of pixel utilized in the FIG. 1 embodiment.

Referring to FIG. 1, the liquid crystal display apparatus according to an exemplary embodiment of the invention includes a liquid crystal panel assembly 300, a gate driver 400, a data driver 500, a gray-voltage generator 800, and a signal controller 600.

In the an electrical equivalent circuit, the liquid crystal panel assembly 300 includes a plurality of display lines G1 through Gn and D1 through Dm, and a plurality of pixels PX connected to the plurality of display lines G1 through Gn and D1 through Dm and arranged in a matrix. Referring to FIG. 2, the liquid crystal panel 300 includes a first substrate 100 and a second substrate 200 facing each other, and a liquid crystal 3 interposed between the first and second substrates 100 and 200.

Signal lines comprise a plurality of gate lines for transmitting gate signals (also called "scan signals"), and a plurality of data lines D1 through Dm for transmitting data signals. The plurality of gate lines G1 through Gn extend in a row direction and are parallel or essentially parallel to one another, and the plurality of data lines D1 through Dm extend in a column direction and are parallel or essentially parallel to one another.

Each of pixels PX comprises a pair of pixel units, and each of the pixel units comprises liquid crystal capacitors Clca and Clcb, respectively. At least one of the pixel units comprise a gate line, data line, and switching element (not shown) connected with liquid crystal capacitor Clca or Clcb.

The liquid crystal capacitors Clca, Clcb have pixel unit electrodes PEa and PEb formed on the first substrate 100 and a common electrode CE formed on the second substrate 200, respectively, as two electrodes. The liquid crystal layer disposed between the pixel unit electrodes PEa and PEb and the common electrode 270 functions as a dielectric. The pair of pixel unit electrodes PEa and PEb are separated from each other, and make one pixel electrode PE.

The common electrode CE is connected to the common voltage Vcom, and covers the entire surface of the second substrate 200. The liquid crystal layer 3 has negative dielectric anisotropy ($\Delta\epsilon<0$), i.e., the long axes of the liquid crystal molecule are aligned vertically with respect to a field-generating direction. Alternatively, the common electrode 270 may disposed on the first substrate 100, and, in this case, at least one of the pixel electrode PE and the common electrode 270 may have shapes resembling bars or stripes.

For a color display, each pixel PX uniquely represents one of three primary colors such as red, green and blue (R, G and B) colors (spatial division) or sequentially represents the three primary colors in time (temporal division), thereby obtaining a desired color. FIG. 2 is an equivalent circuit diagram of a spatial division. A color filter CF may be formed in a portion of a common electrode CE of the second substrate 200.

One or more polarizers (not shown) may be attached to at least one of the first substrate 100 and the second substrate 200 to transform light polarization into light transmittance.

The gamma voltage generator 800 generates two sets of a plurality of gray voltages related to the transmittance of the pixels. The data voltages in one set have a positive polarity with respect to the common voltage Vcom, while those in the other set have a negative polarity with respect to the common voltage Vcom. The positive-polarity data voltages and negative-polarity data voltages are alternately supplied to the liquid crystal panel 100 during inversion driving.

The gate driver 400 is connected to the gate lines G1-Gn of the liquid crystal panel assembly 300, and applies gate signals from an external device to the gate lines G1-Gn, each gate signal being a combination of a gate-on voltage Von and a gate-off voltage Voff.

The data driver 500 is connected to the plurality of data lines D1-Dm of the liquid crystal panel assembly 300. The data driver 500 generates gray voltages based on a plurality of voltages supplied from the gamma voltage generator 800, selects the generated gamma voltages, and applies the gamma voltages to each pixel as data signals.

The signal controller 600 controls the gate driver 400 and the data driver 500.

The gate driver 400, the data driver 500 or the gamma voltage generator 800 may be directly mounted on the liquid crystal panel assembly 300 in the form of at least one IC chip on the liquid crystal panel assembly 300. Alternatively, the gate driver 400 or the data driver 500 may be attached to the liquid crystal panel 300 in the form of a tape carrier package ("TCP") on a flexible printed circuit ("FPC") film (not shown) in the liquid crystal panel assembly 300. Alternatively, the gate driver 400 or the data driver 500 together with the plurality of display lines G1 through Gn and D1 through Dm, and switching devices Q may be integrally formed with the liquid crystal panel assembly 300.

Figure 3:
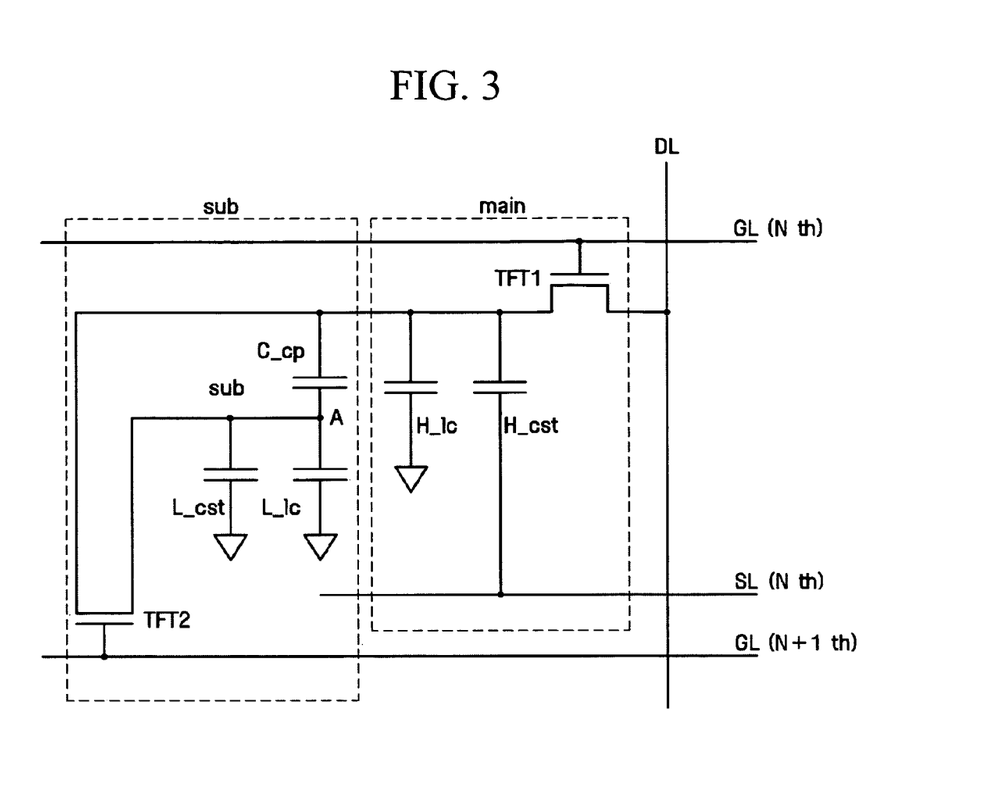
FIG. 3 is an equivalent a circuit diagram of the a pixel of a liquid display apparatus according to an embodiment of the invention.

FIG. 3 is an equivalent a circuit diagram of a pixel of a liquid display apparatus according to an embodiment of the invention.

The liquid crystal panel assembly 300 comprises the plurality of gate lines GL, and the data line DL, and pixels PX coupled to associated ones gate line GL and the data lines DL.

The pixel PX comprises the pair of the first pixel unit main, and the second pixel unit sub, and the coupling capacitor C_cp connected between the first pixel unit main and the second pixel unit sub.

The first pixel unit main comprises a first TFT TFT1 connected with the n-th gate line GL and the data line DL, a first liquid crystal capacitor H_lc connected with the first TFT TFT1, and the first storage capacitor H_cst connected with the first TFT TFT1. The second pixel unit sub comprises the second TFT TFT2 connected with the (n+1)-th gate line GL, the second liquid crystal capacitor L_lc connected with the first TFT TFT1, and the second storage capacitor L_cst connected with the second TFT TFT2.

The coupling capacitor C_cp is disposed between the first pixel unit main and the second pixel unit sub. However, only one of the first storage capacitor H_cst and the second storage capacitor L_cst may be disposed.

One electrode of first liquid crystal capacitor H_lc and one electrode of the first storage capacitor H_cst may be formed of a transparent first pixel electrode, and one electrode of the second liquid crystal capacitor L_lc and one electrode of the second storage capacitor L_cst may be formed of a transparent second pixel electrode. Also, one electrode of the coupling capacitor C_cp may be formed of the first pixel electrode, and the other electrode of the coupling capacitor C_cp may be formed of the second pixel electrode.

Explaining the operation of the pixel, first, the first TFT TFT1 provides a data voltage with the first pixel electrode responding to the gate signal applied to the n-th gate line. The first pixel unit voltage, that is, the voltage applied to the first liquid crystal capacitor H_lc is provided with the second pixel unit sub by the coupling capacitor Ccp. When the voltage of the first liquid crystal capacitor H_lc is Va, and the voltage of the second liquid crystal capacitor L_lc is Vb, then Vb is given by Equation 1 below.

$$Vb = Va \times (C\_cp/(C\_cp+L\_lc+L\_cst)) \quad (1)$$

Because the value of C_cp/(C_cp+L_lc+L_cst) is less than 1, the voltage Vb of the second liquid crystal capacitor L_lc is less than Va of the first liquid crystal capacitor H_lc.

The voltages Va and Vb are controlled by varying the capacitance of the coupling capacitor C_cp. The transmittance of the liquid crystal is determined by the voltage Vb of the second liquid crystal capacitor L_lc and than the voltage Va of the first liquid crystal capacitor H_lc, and then an image is displayed according to the transmittance.

Next, the second TFT TFT2 is turned on by a gate signal applied to the (n+1)-th gate line GL. When the second TFT TFT2 is turned on, the coupling capacitor C_cp is discharged. That is, the charge of the coupling capacitor C_cp may be provided with the second liquid crystal capacitor L_lc. For example, if the positive data voltage is provided with the first liquid crystal capacitor H_lc and the second liquid crystal capacitor L_lc, the charge of the coupling capacitor C_cp may be provided with the second liquid crystal capacitor L_lc, and then the level of the voltage of the second liquid crystal capacitor L_lc is increased.

Here, the level of the voltage of the second liquid crystal capacitor L_lc by discharging of the coupling capacitor C_cp when the data voltage having high gray is provided is higher than that when the data voltage having low gray is provided. That is, the difference between the voltage Va and the voltage Vb when the data voltage having high gray is provided is higher than that when the data voltage having low gray is provided. Therefore, the lateral visibility of the display apparatus is improved.

Also, if the second TFT TFT2 is turned on, a path is formed through which charges produced at node A move. Thus, charge is not accumulated at node A, and image sticking can be reduced.

Here, if the ratio of channel width to channel length W/L of the second TFT TFT2 is very large, the voltage difference between both nodes of the coupling capacitor C_cp will be zero, and then the voltage Va of the first liquid crystal capacitor H_lc and voltage Vb of the second liquid crystal capacitor L_lc will be the same, so the lateral visibility of the display apparatus will not be improved. Thus, it is preferable that the ratio of channel width to channel length W/L of the second TFT TFT2 should not be very large.

The other electrode of the first storage capacitor H_cst is connected with the n-th storage electrode line SL, and a storage-capacitance voltage applied to the n-th storage electrode line SL may have a fixed level. The storage-capacitance voltage may be the common voltage Vcom applied to the common electrode CE.

Also, the storage-capacitance voltage may have a variable level, for example, the level of the storage-capacitance voltage may vary periodically. The storage-capacitance voltage will now be described in detail with reference to FIG. 4.

Figure 4:
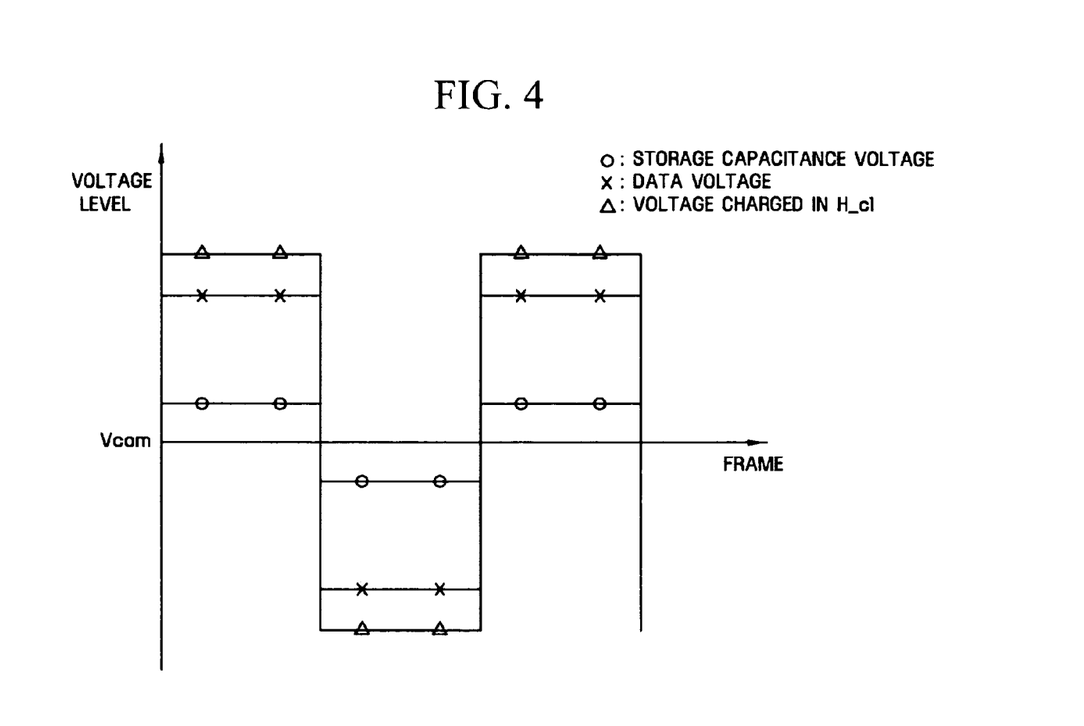
FIG. 4 is a signal diagram illustrating signals of the type used in an operation of a pixel of the type illustrated in FIG. 3.

The data voltage applied to the data line DL, the storage-capacitance voltage applied to the storage electrode line SL, and the voltage of the first liquid crystal capacitor H_lc are shown in FIG. 4. For explanatory convenience, it is assumed that the polarity of the data voltage varies with respect to the common voltage Vcom frame by frame.

Referring to FIG. 4, when the polarity of the data voltage varies with respect to the common voltage Vcom, the polarity of the storage-capacitance voltage varies identically with the polarity of the data voltage. For example, when the data voltage is positive with respect to the common voltage Vcom, the storage-capacitance voltage is positive with respect to the common voltage Vcom, and when the data voltage is negative with respect to the common voltage Vcom, the storage-capacitance voltage is negative with respect to the common voltage Vcom.

When the storage-capacitance voltage varies, the voltage of the first liquid crystal capacitor H_lc connected with the first storage capacitor H_cst varies as shown FIG. 4. For example, the voltage of the first liquid crystal capacitor H_lc may be equal to the sum of the data voltage and the storage-capacitance voltage.

As described above, if the storage-capacitance voltage varies, the voltage of first liquid crystal capacitor H_lc may be the predetermined voltage that is higher than the data voltage applied to the data line DL. Also, if the voltage of the first liquid crystal capacitor H_lc increases, the voltage of the second liquid crystal capacitor L_lc increases. In this case, the transmittance of the pixel units main and sub may be improved.

Figure 5:
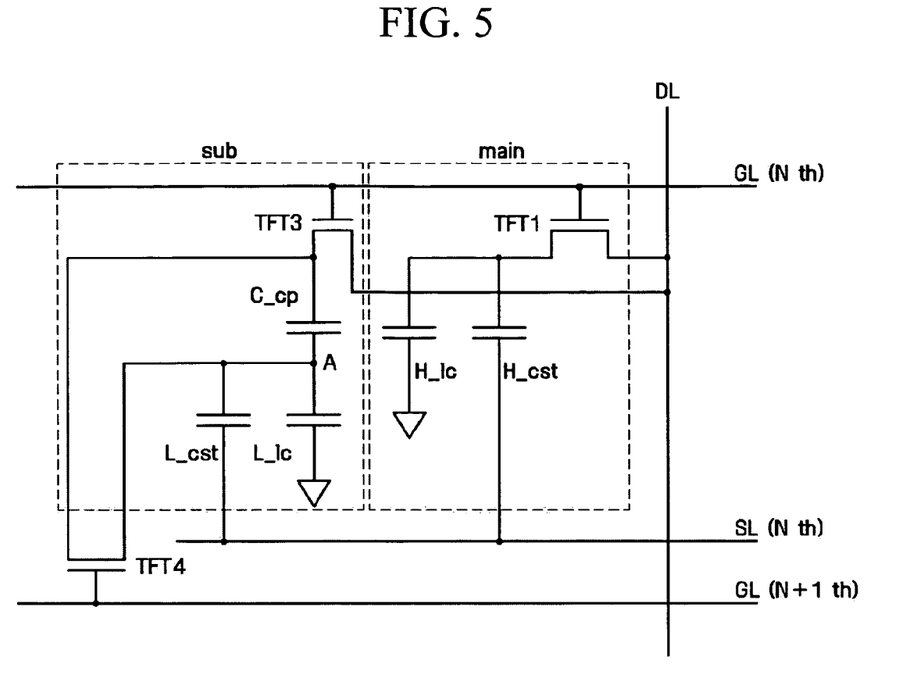
FIG. 5 is an equivalent circuit diagram of a pixel of a liquid display apparatus according to another exemplary embodiment of the invention.

A display apparatus according to a second embodiment of the present invention is illustrated in FIG. 5 which is an equivalent circuit diagram of a pixel of a liquid display apparatus according to the second embodiment of the invention.

The display apparatus according to the second embodiment of the present invention further comprises a third TFT TFT3 for controlling the operation of the second liquid crystal capacitor L_lc. In contrast to the prior embodiment, the coupling capacitor C_cp is not directly connected with the first liquid crystal capacitor H_lc, but rather is connected with the third TFT TFT3.

More specifically, each pixel PX comprises a main pixel unit and a sub-pixel unit. The main pixel unit and sub-pixel unit are connected with the n-th gate line GL of the plurality of gate lines and to data line DL. The main pixel unit comprises a first liquid crystal capacitor H_lc, first storage capacitor H_cst and a first TFT TFT1 connected with the n-th gate line GL. The sub-pixel unit comprises a second liquid crystal capacitor L_lc, a second storage capacitor L_cst, the third TFT TFT3 connected with the n-th gate line GL, and a coupling capacitor C_cp.

The gate electrode of fourth TFT TFT4 is connected with the (n+1)-th gate line GL, the source electrode of fourth TFT TFT4 is connected with the drain electrode of third TFT TFT3 and to one electrode of the coupling capacitor C_cp, and the drain electrode of a fourth TFT TFT4 is connected with the one electrode of the second liquid crystal capacitor L_lc and the other electrode of the coupling capacitor C_cp. One electrode of the first liquid crystal capacitor H_lc and one electrode of the first storage capacitor H_cst may be formed of a transparent first pixel electrode. One electrode of the second liquid crystal capacitor L_lc and one electrode of the second storage capacitor L_cst may be formed of a transparent second pixel electrode.

The operation of the pixel illustrated in FIG. 5 is as follows. When a gate signal is applied to the n-th gate line GL, the first TFT TFT1 and the third TFT TFT3 are turned on. Therefore, the first liquid crystal capacitor H_lc is charged to the data voltage. Also, the data voltage is divided by the coupling capacitor C_cp and the second liquid crystal capacitor L_lc, and then the voltage on second liquid crystal capacitor L_lc becomes a predetermined value.

Next, when a gate signal is applied to the (n+1)-th gate line, the fourth TFT TFT4 is turned on. Thus the coupling capacitor C_cp is discharged. Therefore, the charges of the coupling capacitor C_cp can be provided to the second liquid crystal capacitor L_lc, and the lateral visibility of the display apparatus is improved.

Also, when the third TFT TFT3 is turned on, a path is formed through which charges at node A move. Thus, charge is not accumulated at node A, and image sticking is reduced.

In the present exemplary embodiment of the present invention, though the fourth TFT TFT4 is turned on, the data voltage of the first liquid crystal capacitor H_lc may not vary, because the coupling capacitor C_cp is not connected with the first liquid crystal capacitor H_lc.

The other electrode of the first storage capacitor H_cst and the second storage capacitor L_cst are connected to the n-th storage electrode line SL, as a storage-capacitance electrode. Here, a storage-capacitance voltage applied to the storage-capacitance electrode may have a fixed level. The storage-capacitance voltage may be the common voltage Vcom applied to the common electrode CE.

Also, the storage-capacitance voltage may have a variable level, for example, the level of the storage-capacitance voltage may vary periodically, as described above. In this case, the transmittance of the pixel units main and sub may be improved.

To sum up, the display apparatus and the driving method thereof according to the exemplary embodiments of the present invention provide excellent lateral visibility without incurring the image sticking phenomenon.

While the present invention has been particularly shown and described with reference to exemplary embodiments thereof, it will be understood by those of ordinary skill in the art that various changes in form and detail may be made therein without departing from the spirit and scope of the present invention which is defined by the following claims. The exemplary embodiments are descriptive only and not limiting.

What is claimed is:

1. A display apparatus comprising:
    a plurality of gate lines;
    a data line intersecting the plurality of gate lines;
    a first pixel unit associated with an n-th gate line of the plurality of gate lines and the data line;
    a second pixel unit associated with a (n+1)-th gate line of the plurality of gate lines, wherein the first pixel unit and the second pixel unit are part of a pixel; and
    a coupling capacitor having a first electrode and a second electrode, the coupling capacitor being connected between the first pixel unit and the second pixel unit,
    wherein the first pixel unit comprises a first liquid crystal capacitor and a first thin film transistor, the second pixel unit comprises a second liquid crystal capacitor and a second thin film transistor, and the second thin film transistor has a source electrode and a drain electrode connected to the first electrode and the second electrode of the coupling capacitor.

2. The display apparatus of claim 1, wherein one electrode of the first liquid crystal capacitor and one of the first and second electrodes of the coupling capacitor are formed of a first pixel electrode.

3. The display apparatus of claim 1, wherein one electrode of the first liquid crystal capacitor and one of the first and second electrodes of the coupling capacitor are formed of a first pixel electrode, and the first pixel electrode is formed of transparent metal.

4. The display apparatus of claim 1, wherein one electrode of the second liquid crystal capacitor and one of the first and second electrodes of the coupling capacitor are formed of a second pixel electrode.

5. The display apparatus of claim 4, wherein the second pixel electrode is formed of transparent metal.

6. The display apparatus of claim 1, further comprising: storage electrode lines, wherein the first pixel unit comprises a storage capacitor connected with the at least one storage electrode line and the first thin film transistor.

7. The display apparatus of claim 6, wherein a storage-capacitance voltage applied to the storage electrode line has a fixed level.

8. The display apparatus of claim 6, wherein a storage-capacitance voltage applied to the storage electrode line has a variable level.

* * * * *